United States Patent
Lebel et al.

(10) Patent No.: US 9,267,017 B2
(45) Date of Patent: Feb. 23, 2016

(54) THERMOPLASTIC POLYURETHANES WITH EXCEPTIONAL FIRE RESISTANCE

(75) Inventors: Marc-Andre Lebel, Boxborough, MA (US); Jan-Pleun Lens, Boston, MA (US)

(73) Assignee: FRX Polymers, Inc., Chelmsford, MA (US)

( * ) Notice: Subject to any disclaimer, the term of this patent is extended or adjusted under 35 U.S.C. 154(b) by 390 days.

(21) Appl. No.: 13/589,697

(22) Filed: Aug. 20, 2012

(65) Prior Publication Data

US 2013/0046036 A1 Feb. 21, 2013

Related U.S. Application Data

(60) Provisional application No. 61/525,455, filed on Aug. 19, 2011.

(51) Int. Cl.
| | |
|---|---|
| *C08L 75/04* | (2006.01) |
| *C08K 5/5317* | (2006.01) |
| *C08K 7/02* | (2006.01) |
| *C08K 7/06* | (2006.01) |
| *C08L 75/06* | (2006.01) |
| *C08L 75/08* | (2006.01) |

(52) U.S. Cl.
CPC ............... *C08K 5/5317* (2013.01); *C08K 7/02* (2013.01); *C08K 7/06* (2013.01); *C08L 75/06* (2013.01); *C08L 75/08* (2013.01)

(58) Field of Classification Search
USPC ........................................................ 521/170
See application file for complete search history.

(56) References Cited

U.S. PATENT DOCUMENTS

| | | | |
|---|---|---|---|
| 3,945,954 A | 3/1976 | Batorewicz | |
| 3,948,860 A | 4/1976 | Ogawa et al. | |
| 4,564,468 A | 1/1986 | Barda | |
| 4,690,954 A | 9/1987 | Wampfler | |
| 5,837,760 A | 11/1998 | Hackl et al. | |
| 6,861,499 B2 | 3/2005 | Vinciguerra et al. | |
| 7,153,901 B2 | 12/2006 | Hussain et al. | |
| 7,449,526 B2 | 11/2008 | Levchik et al. | |
| 7,645,850 B2 | 1/2010 | Freitag | |
| 7,816,486 B2 | 10/2010 | Freitag et al. | |
| 7,838,604 B2 | 11/2010 | Freitag | |
| 7,862,749 B2 | 1/2011 | Sjerps | |
| 7,893,143 B2 | 2/2011 | Peerlings et al. | |
| 8,530,044 B2 * | 9/2013 | Kagumba et al. | 428/304.4 |
| 8,563,638 B2 * | 10/2013 | Kagumba et al. | 524/128 |
| 8,779,041 B2 * | 7/2014 | Kagumba et al. | 524/128 |
| 2003/0133679 A1 | 7/2003 | Murphy et al. | |
| 2006/0020064 A1 | 1/2006 | Bauer et al. | |
| 2006/0079612 A1 * | 4/2006 | Troutman et al. | 524/99 |
| 2007/0032633 A1 | 2/2007 | Freitag et al. | |
| 2009/0149582 A1 | 6/2009 | Peerlings et al. | |
| 2009/0306236 A1 * | 12/2009 | Sounik et al. | 521/131 |
| 2009/0326108 A1 | 12/2009 | Kim et al. | |
| 2010/0056660 A1 * | 3/2010 | Rosthauser | 521/172 |
| 2012/0172500 A1 | 7/2012 | Freitag et al. | |
| 2012/0264844 A1 * | 10/2012 | Freitag et al. | 521/189 |
| 2014/0000751 A1 * | 1/2014 | Kagumba et al. | 139/420 R |

OTHER PUBLICATIONS

International Search Report dated Feb. 26, 2013 for PCT/US2012/051587.
Becker, et al., "Polyurethane", *Plastics Handbook*, vol. 7, Germany, Vienna, Carl Hanser Publishing, (1983) (TOC).
Wilkie, et al., "Fundamentals of Fire Testing and What Tests Measure", *Fire Retardancy of Polymeric Materials*, Ch. 14, CRC Press, Boca Raton, FL, 2nd ed. (2010) (TOC).

* cited by examiner

*Primary Examiner* — Mike M Dollinger
(74) *Attorney, Agent, or Firm* — Pepper Hamilton LLP

(57) ABSTRACT

Thermoplastic polyurethanes (TPUs) formulations including phosphonate oligomers, phosphonate co-oligomers, phosphonate polymers, or phosphonate containing copolymers which exhibit an excellent combination of properties including optical transparency and melt flow without significant reduction in other important physical or mechanical properties and exceptional fire resistance are described herein.

12 Claims, No Drawings

THERMOPLASTIC POLYURETHANES WITH EXCEPTIONAL FIRE RESISTANCE

CROSS-REFERENCE TO RELATED APPLICATIONS

This application claims priority to U.S. Provisional Application No. 61/525,455, entitled, "Thermoplastic Polyurethanes with Exceptional Fire Resistance," filed Aug. 19, 2011, which is incorporated herein by reference in its entirety.

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Not applicable

SUMMARY OF THE INVENTION

Thermoplastic polyurethanes (TPUs) and transparent TPUs with exceptional fire resistance have been developed by formulating blends with phosphonate oligomers, phosphonate co-oligomers, phosphonate polymers, and phosphonate copolymers which exhibit an excellent combination of properties. These include outstanding fire resistance, optical transparency and melt flow without significant reduction in other important physical or mechanical properties. The formulations avoid the use of toxic halogenated fire retardant additives and other small molecule fire retardant additives that can leach into the environment. This combination of properties has not been achievable in TPUs in a cost effective manner by past synthetic approaches or compositions.

DESCRIPTION OF DRAWINGS

Not applicable

DETAILED DESCRIPTION

Before the present compositions and methods are described, it is to be understood that they are not limited to the particular compositions, methodologies or protocols described, as these may vary. It is also to be understood that the terminology used in the description is for the purpose of describing the particular versions or embodiments only, and is not intended to limit their scope which will be limited only by the appended claims.

It must also be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. Although any methods and materials similar or equivalent to those described herein can be used in the practice or testing of embodiments disclosed, the preferred methods, devices, and materials are now described.

"Optional" or "optionally" means that the subsequently described event or circumstance may or may not occur, and that the description includes instances where the event occurs and instances where it does not.

"Substantially no" means that the subsequently described event may occur at most about less than 10% of the time or the subsequently described component may be at most about less than 10% of the total composition, in some embodiments, and in others, at most about less than 5%, and in still others at most about less than 1%.

The term "alkyl" or "alkyl group" refers to a branched or unbranched hydrocarbon or group of 1 to 20 carbon atoms, such as but not limited to methyl, ethyl, n-propyl, isopropyl, n-butyl, isobutyl, t-butyl, octyl, decyl, tetradecyl, hexadecyl, eicosyl, tetracosyl and the like. "Cycloalkyl" or "cycloalkyl groups" are branched or unbranched hydrocarbons in which all or some of the carbons are arranged in a ring such as but not limited to cyclopentyl, cyclohexyl, methylcyclohexyl and the like. The term "lower alkyl" includes an alkyl group of 1 to 10 carbon atoms.

The term "aryl" or "aryl group" refers to monovalent aromatic hydrocarbon radicals or groups consisting of one or more fused rings in which at least one ring is aromatic in nature. Aryls may include but are not limited to phenyl, napthyl, biphenyl ring systems and the like. The aryl group may be unsubstituted or substituted with a variety of substituents including but not limited to alkyl, alkenyl, halide, benzylic, alkyl or aromatic ether, nitro, cyano and the like and combinations thereof.

"Substituent" refers to a molecular group that replaces a hydrogen in a compound and may include but are not limited to trifluoromethyl, nitro, cyano, $C_1$-$C_{20}$ alkyl, aromatic or aryl, halide (F, Cl, Br, I), $C_1$-$C_{20}$ alkyl ether, benzyl halide, benzyl ether, aromatic or aryl ether, hydroxy, alkoxy, amino, alkylamino (—NHR'), dialkylamino (—NR'R") or other groups which do not interfere with the formation of the diaryl alkylphosphonate.

As defined herein, an "arylol" or an "arylol group" is an aryl group with a hydroxyl, OH, group substituent on the aryl ring. Non-limiting examples of an arylol are phenol, naphthalene and the like. A wide variety of arlyols may be used in the embodiments of the invention and are commercially available.

The term "alkanol" or "alkanol group" refers to a compound including an alkyl of 1 to 20 carbon atoms or more having at least one hydroxyl group substituent. Examples of alkanols include but are not limited to methanol, ethanol, 1- and 2-propanol, 1,1-dimethylethanol, hexanol, octanol and the like. Alkanol groups may be optionally substituted with substituents as described above.

The term "alkenol" or "alkenol group" refers to a compound including an alkene 2 to 20 carbon atoms or more having at least one hydroxyl group substituent. The hydroxyl may be arranged in either isomeric configuration (cis or trans). Alkenols may be further substituted with one or more substituents as described above and may be used in place of alkanols in some embodiments of the invention. Alkenols are known to those skilled in the art and many are readily available commercially.

The terms "flame retardant," "flame resistant," "fire resistant," or "fire resistance," as used herein, means that the composition exhibits a limiting oxygen index (LOI) of at least 27. "Flame retardant," "flame resistant," "fire resistant," or "fire resistance," may also be tested by measuring the after-burning time in accordance with the UL test (Subject 94). In this test, the tested materials are given classifications of UL-94 V-0, UL-94 V-1 and UL-94 V-2 on the basis of the results obtained with the ten test specimens. Briefly, the criteria for each of these UL-94-V-classifications are as follows:

UL-94 V-0: the total flaming combustion for each specimen after removal of the ignition flame should not exceed 10 seconds and the total flaming combustion for 5 specimens should not exceed 50 seconds. None of the test specimens should release and drips which ignite absorbent cotton wool.

UL-94 V-1: the total flaming combustion for each specimen after removal of the ignition flame should not exceed 30 seconds and the total flaming combustion for 5 specimens should not exceed 250 seconds. None of the test specimens should release any drips which ignite absorbent cotton wool.

UL-94 V-2: the total flaming combustion for each specimen after removal of the ignition flame should not exceed 30 seconds and the total flaming combustion for 5 specimens should not exceed 250 seconds. Test specimens may release flaming particles, which ignite absorbent cotton wool.

Fire resistance may also be tested by measuring surface flame spread as for example described in Fire Retardancy of Polymeric Materials (C. A. Wilkie, A. B. Morgan), chapter 14 "Fundamentals of Fire Testing and What Tests Measure", CRC Press, Boca Raton, $2^{nd}$ ed, (2010). These test methods provide a laboratory test procedure for measuring and comparing the surface flammability of materials when exposed to a prescribed level of radiant heat energy to measure the surface flammability of materials when exposed to fire. The test is conducted using small specimens that are representative, to the extent possible, of the material or assembly being evaluated. The rate at which flames travel along surfaces depends upon the physical and thermal properties of the material, product or assembly under test, the specimen mounting method and orientation, the type and level of fire or heat exposure, the availability of air, and properties of the surrounding enclosure. If different test conditions are substituted or the end-use conditions are changed, it may not always be possible by or from this test to predict changes in the fire-test-response characteristics measured. Therefore, the results are valid only for the fire test exposure conditions described in this procedure.

Typical surface flame spread tests are the ASTM E-162 and the ASTM E-84 test. ASTM E162 was developed as a less expensive and more convenient flame spread test alternative to E84. The tunnel specified by E84 constitutes an expensive and cumbersome piece of apparatus. The ASTM radiant panel test has numerous advantages over that of E84. The sample size of the E162 is 6 by 18-in, while E84 requires a sample 20-in by 25-ft long, which is a rather large size to deal with. It should be noted, however, that (4) samples are required for E162, whereas E84 requires only one.

With the E162 test, a Flamespread Index (Is) is derived by multiplying a Flamespread Factor (Fs) with the Heat Evolution Factor (Q). Fs resents the speed at which the flame front burns down the specimen and Q represents the heat that is generated above the burning sample. The results are categorized as a class A rating obtained when the Flamespread Index is below 25. A class B rating is obtained with a Flamespread Index between 26 and 75, and the lowest rating, a class C rating, is obtained when the Flamespread index is between 76 and 100.

The E84 test uses a similar classification system, but the Flamespread Index is calculated on the basis of the area under the curve of flame tip location versus time. Additionally, the obscuration of smoke in the exhaust duct of the tunnel is determined and expressed as a smoke developed index (SDI). This number is based on the area under the light transmission versus time curve normalized to the area for red oak flooring, which by definition has an SDI of 100. In all classification cases (A, B, or C), the SDI must be 450 or less.

The term "hydrolytic stability" as used herein is defined as the ability of the polymer to resist hydrolysis in a water boil test. The ability to resist hydrolysis can be measured by the change in relative viscosity after exposure which is an indication in molecular weight change. For example, a neat resin sample can be placed in pure water (triple distilled) for up to 168 hours under reflux conditions at normal pressure. The samples can be removed periodically, and the relative viscosity ($\eta_{rel}$) can be determined by dissolving the sample in dichloromethane at 25° C. at a concentration of 0.5 g polymer/liter and measuring the solution with an Ubbelohde viscometer. A significant change in the $\eta_{rel}$ value after the water boil is indicative of a change in molecular weight of the polymer due to hydrolysis. A polymer with good hydrolytic stability would not exhibit a significant change in $\eta_{rel}$ as a result of this test.

"Molecular weight," as used herein, can be determined by relative viscosity ($\eta_{rel}$) and/or gel permeation chromatography (GPC). "Relative viscosity" of a polymer is measured by dissolving a known quantity of polymer in a solvent and comparing the time it takes for this solution and the neat solvent to travel through a specially designed capillary (viscometer) at a constant temperature. Relative viscosity is a measurement that is indicative of the molecular weight of a polymer. It is also well known that a reduction in relative viscosity is indicative of a reduction in molecular weight, and reduction in molecular weight causes loss of mechanical properties such as strength and toughness. GPC provides information about the molecular weight and molecular weight distribution of a polymer and is typically obtained from a calibration line that is determined using polystyrene (PS) samples of known molecular weights. It is known that the molecular weight distribution of a polymer is important to properties such as thermo-oxidative stability (due to different amount of end groups), toughness, melt flow, and fire resistance, for example, low molecular weight polymers drip more when burned.

The term "toughness", as used herein, is determined qualitatively on a film or a molded specimen.

The terms "transparency," "optical transparency," and "light transmission" used herein are intended to describe the amount of visible light (wavelength range approximately 300 nm to 700 nm) that can pass through the thickness of a given sample, usually presented in a percentage less than 100%. The transparency is typically measured using a visible spectrophotometer by placing the sample in the light beam, and the amount of light that passes through is recorded.

Thermoplastic polyurethanes (TPU) are a class of urethane plastics with many useful properties, including elasticity, transparency, toughness, and resistance to oil, grease and abrasion, and thermoplastic-like processability. An overview of the production, properties and applications of TPUs is given for example in the Plastics Handbook (G. Becker, D. Braun), volume 7 "Polyurethane", Munich, Vienna, Carl Hanser Publishing, 1983. TPUs are thermoplastic elastomers consisting of linear segmented block copolymers composed of hard and soft segments derived from the monomers used in their synthesis. Polyurethanes are, generally, synthesized by the reaction of a difunctional isocyanate compound, oligomer, or polymer with a difunctional hydroxy compound, oligomer, or polymer or combinations thereof, in the presence of a catalyst. Other additives may also be present during synthesis. Consequently, there are a tremendous number of possible combinations that can be synthesized by varying the chemical structure of the reactants and the molecular weight range of the TPU, and an enormous variety of different TPUs in which the polymer's structure has been manipulated to achieve the desired combination of properties for a specific application.

Embodiments of the invention include any TPUs encompassed by the description above, and TPUs prepared from any combination of compounds, oligomers, or polymers. For example, in some embodiments, the TPUs may be prepared from difunctional isocyanates (i.e., diisocyanates) that are aromatic including, but not limited to, diphenylmethane diisocyanate (MDI) or toluene diisocyanate (TDI) or aliphatic, including, but not limited to, hexamethylene diisocyanate (HDI) or isophorone diisocyanate (IPDI). In other embodiments, the difunctional isocyanates may also be polymeric and may include, for example, polymeric diphenylmethane diisocyanate, which is a blend of molecules having two-, three-, and four- or more isocyanate groups, with an average functionality of 2.7. In certain embodiments, the diisocyanates can be modified by partially reacting them with a polyol to form a prepolymer. A "true prepolymer" is formed when the stoichiometric ratio of isocyanate to hydroxyl is equal to 2:1, and a "quasi-prepolymer" is formed when the stoichiometric ratio of isocyanate to hydroxyl groups is greater than 2:1. Such prepolymers can be exposed to moisture to convert the isocyanate to amino groups which subsequently react with remaining isocyanate groups to form a urea linkage.

The other monomer used in the synthesis of TPUs is, generally, a difunctional hydroxyl compound (i.e., diol), oligomer or polymer. Examples of commonly used monomeric diols used in the making of TPUs include, but are not limited to, 1,2-ethylene glycol, 1,4-butanediol, diethylene glycol, glycerine, and trimethylolpropane. Polymeric diols (i.e., polyols) can also be used in the production of TPUs, and are often formed by base-catalyzed addition of propylene oxide and/or ethylene oxide onto a hydroxyl or amine containing initiator, or by polyesterification of a di-acid, such as adipic acid, with glycols, such as ethylene glycol or dipropylene glycol. The most common polyols are polyether polyols, polycarbonate diols and polyester polyols. The molecular weight of the polyols can cover a broad range from oligomeric to high molecular weight polymer.

Catalysts used in the synthesis of TPUs include, but are not limited to, amine compounds and organometallic complexes. Examples of amine catalysts include tertiary amine catalysts such as, but are not limited to, triethylenediamine also known as 1,4-diazabicyclo[2.2.2]octane, dimethylcyclohexylamine (DMCHA), and dimethyl-ethanolamine (DMEA). Organometallic compounds based on mercury, lead, tin (dibutyltin dilaurate), bismuth (bismuth octanoate), and zinc can also be used as polyurethane catalysts. Mercury carboxylates, such as phenylmercuric neodeconate, are particularly effective catalysts. Bismuth and zinc carboxylates have also been used as catalysts in the synthesis of TPUs. Alkyl tin carboxylates, oxides and mercaptides oxides are used including, but not limited to, dibutyltin dilaurate, dioctyltin mercaptide, and dibutyltin oxide.

TPUs may be produced continuously or discontinuously. Thermoplastically processable polyurethane elastomers may be made up either step by step (prepolymer dosing process) or by the simultaneous reaction of all components in one stage (one shot dosing process). The best known production processes are the band process and the extrusion process.

A number of TPUs are commercially available including but not limited to Elastollan (BASF & Elastogran), Pearlthane (Merquinsa), Desmopan (Bayer), Estane (Lubrizol), Pellethane (Lubrizol), New power industrial limited (New Power®), Irogran (Huntsman), Exelast EC (Shin-Etsu Polymer Europe B.V.), Laripur (COIM SpA), Avalon (Huntsman) and Isothane (Greco).

Currently available fire resistant TPUs require halogenated monomers such as halogenated diols, or halogenated additives or small molecules that can leach out of the TPU over time to achieve fire resistance. As a consequence, these TPUs are not environmentally friendly.

Embodiments of the invention are directed to fire resistant TPUs, compositions, articles of manufacture, and other products including such TPUs, and processes for making these TPUs and such compositions. Various embodiments are directed to TPUs formulated with phosphonate oligomers, phosphonate co-oligomers, phosphonate polymers, and phosphonate copolymers including phosphonate components, and in certain embodiments, the TPUs may be formulated with phosphonate oligomers, phosphonate co-oligomers, phosphonate polymers, and copolymers including phosphonate components including aryl components (i.e., "aryl phosphonates"). The compositions of the invention may include TPU and phosphonate oligomers, phosphonate co-oligomers, phosphonate polymers, and phosphonate copolymers that are combined to result in a composition in which non-covalent, ionic interactions hold the TPU and phosphonate components together. In other embodiments, the phosphonate oligomers, phosphonate co-oligomers, phosphonate polymers, and phosphonate copolymers may be covalently attached to the TPU either by binding to free functional groups on the TPU or crosslinking TPU chains or by being incorporated into the main chain of the TPU during preparation of the TPU.

The methods of some embodiments include mixing polyurethanes and polyurethane precursors with phosphonate oligomers, phosphonate co-oligomers, phosphonate polymers, and copolymers including phosphonate components in a melt by any of the myriad of mixing processes commonly used in the plastics industry. The fire resistant TPUs including phosphonate oligomers, phosphonate co-oligomers, phosphonate polymers, and copolymers including phosphonate components exhibit a combination of properties including good melt processability and optical transparency, without significant reduction in elastomeric properties and tensile strength, toughness, and elongation to break that are improved over the properties of currently available TPUs while providing less environmental impact. In particular embodiments, the TPU formulations of the invention may have optical transparencies of at least 40%, or about 40% to about 100%, about 50% to about 95%, about 60% to about 90%, about 65% to about 85%, or about 70% to about 80%, or any value between these exemplary ranges.

Phosphonate oligomers, phosphonate co-oligomers, phosphonate polymers, and phosphonate containing copolymers are known in the literature and any such phosphonates can be used in embodiments of the invention. For example, in various embodiments, the phosphonate oligomers, phosphonate co-oligomers, phosphonate polymers, and phosphonate containing copolymers may be linear, branched, or hyperbranched, and in some embodiments, the phosphonate oligomers, phosphonate co-oligomers, phosphonate polymers, and phosphonate containing copolymers may contain functional end groups such as, but not limited to, phenol, phosphonate, ester, carbonate, epoxy, vinyl, and the like. In particular embodiments, the phosphonate oligomers, phosphonate co-oligomers, phosphonate polymers, and phosphonate containing copolymers may be predominately hydroxyl terminated polyphosphonates or oligophosphonates, random or block co-oligo(phosphonate ester)s and co-oligo(phosphonate carbonate)s, such as those described in U.S. Pat. Nos. 6,861,499; 7,449,526; 7,645,850; 7,816,486; and 7,838,604 each of which are hereby incorporated by reference in their entireties. In certain embodiments, the phosphonate oligomers, phosphonate co-oligomers, phosphonate polymers, and phosphonate containing copolymers may include one or more structural units of general formula:

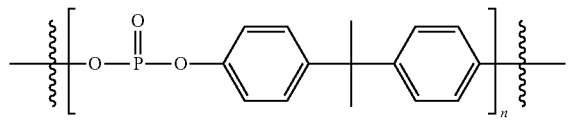

where n is an integer up to about 90. In some embodiments, such branched or linear polyphosphonates or copolyphosphonates may also include one or more carbonate structural units. Such phosphonates including at least one aryl group will be referred to herein as aryl phosphonates.

The linear or branched polyphosphonates or copolyphosphonates may be prepared by any method known in the art. However, the method by which the polyphosphonate or copolyphosphonate is prepared may affect the properties of the final mixture. For example, in some embodiments, the polyphosphonate component may be prepared by polymerization of one or more diphenyl phosphonates (DPP) and one or more aromatic dihydroxy compound, such as bisphenol A (BPA). The DPP and aromatic dihydroxy compound used may be prepared by any method and combined to form polyphosphonate by any method. Additionally, other components such as, for example, branching agents and catalysts may be used in such process.

In various embodiments, the phosphonate oligomers, phosphonate co-oligomers, phosphonate polymers, and phosphonate containing copolymers may have a weight average molecular weight of greater than 500 g/mole. For example, in some embodiments, the phosphonate oligomers, phosphonate co-oligomers, phosphonate polymers, and phosphonate containing copolymers may have weight average molecular weight of from about 1,000 g/mole to about 140,000 g/mole, and in other embodiments, the phosphonate oligomers, phosphonate co-oligomers, phosphonate polymers, and phosphonate containing copolymers may have a weight average molecular weight of from about 1,500 g/mole to about 90,000 g/mol, about 10,000 g/mole to about 80,000 g/mole, or any weight average molecular weight within these ranges. Such phosphonate oligomers, phosphonate co-oligomers, phosphonate polymers, and phosphonate containing copolymers are generally soluble in, for example, methylene chloride; however, phosphonate oligomers, phosphonate co-oligomers, phosphonate polymers, and phosphonate containing copolymers can also be hydrolytically stable and insoluble in, for example, methylene chloride. Both soluble or insoluble phosphonate oligomers, phosphonate co-oligomers, phosphonate polymers, and phosphonate containing copolymers can be included in the formulations encompassed by the invention, and in some embodiments, a mixture of soluble and insoluble phosphonate oligomers, phosphonate co-oligomers, phosphonate polymers, and phosphonate containing copolymers can be included in the TPU formulations of the invention.

In various embodiments, the phosphonate oligomers, phosphonate co-oligomers, phosphonate polymers, and phosphonate containing copolymers included in a TPU formulation may be present at loading levels of from about 5 wt. % to about 50 wt. % by weight, about 10 wt. % to about 40 wt. %, about 15 wt. % to about 25 wt. %, and so on, or any weight percentage there between. For example, in particular embodiments, the phosphonate oligomers, phosphonate co-oligomers, phosphonate polymers, and phosphonate containing copolymers may be included in TPU formulations at loading levels of 5 wt. %, 10 wt. %, 15 wt. %, 20 wt. %, 25 wt. %, 30 wt. %, 35 wt. %, 40 wt. %, 45 wt. %, or 50 wt. %.

The TPU component of formulations including TPU and phosphonate oligomers, phosphonate co-oligomers, phosphonate polymers, and phosphonate containing copolymers may be any TPU known in the art including but not limited to those described above. For example, the TPUs encompassed by embodiments can include aromatic diisocyanates such as, but not limited to, diphenylmethane diisocyanate (MDI) and toluene diisocyanate (TDI) or aliphatic diisocynates such as, but not limited to, hexamethylene diisocyanate (HDI) and isophorone diisocyanate (IPDI), or polymeric isocyanates having two-, three-, and four- or more isocyanate groups, and diols including, but are not limited to, 1,2-ethylene glycol, 1,4-butanediol, diethylene glycol, glycerine, and trimethylolpropane or polyols formed by base-catalyzed addition of propylene oxide and/or ethylene oxide onto a hydroxyl or amine containing initiator or polyesterification of a di-acid, such as adipic acid, with glycols, such as ethylene glycol or dipropylene glycol. In particular embodiments, the polyol component may be a polyether polyol, polycarbonate diol, or polyester polyols. More specific TPUs include commercially available TPUs including but not limited to Elastollan (BASF & Elastogran), Pearlthane (Merquinsa), Desmopan (Bayer), Estane (Lubrizol), Pellethane (Lubrizol), New power industrial limited (New Power®), Irogran (Huntsman), Exelast EC (Shin-Etsu Polymer Europe B.V.), Laripur (COIM SpA), Avalon (Huntsman) and Isothane (Greco).

Compositions including TPU and one or more phosphonate oligomers, phosphonate co-oligomers, phosphonate polymers, and phosphonate containing copolymers such as those described above generally exhibit excellent fire resistance, transparency, and melt processability, and this combination of properties is achieved without significantly changing the mechanical properties of the TPU including good flexibility and toughness. In particular, the one or more phosphonate oligomers, phosphonate co-oligomers, phosphonate polymers, and phosphonate containing copolymers with TPU results in substantially no loss in transparency while providing good flame resistance. In general, prior art compounds with good flame resistance develop a haze or some opacity that is not observed in the compositions of the invention. Therefore, compositions including only TPU and one or more phosphonate oligomers, phosphonate co-oligomers, phosphonate polymers, and phosphonate containing copolymers can be used only as an engineering polymer in articles of manufacture.

In other embodiments, such compositions including the combination of a TPU and one or more phosphonate oligomers, phosphonate co-oligomers, phosphonate polymers, and phosphonate containing copolymers may further include one or more additives such as, but not limited to, anti-oxidants, anti-dripping agents, additional flame retardants, UV stabilizers, glass, carbon, aramide, graphite, lubricants, continuous fiber or chopped fiber. Still other embodiments include polymer compositions including at least one composition including TPU and one or more phosphonate oligomers, phosphonate co-oligomers, phosphonate polymers, and phosphonate containing copolymers and at least one other polymer, oligomer, or monomer mixture. The other polymer, oligomer, or monomer mixtures of such embodiments may include, or partially include, monomers intended to produce oligomers or polymers of the following families: polycarbonate, polyacrylate, polyacrylonitrile, polyester, polyamide, polystyrene, polyurethane, polyepoxy, poly(acrylonitrile butadiene styrene), polyimide, polyarylate, poly(arylene ether), polyethylene, polypropylene, polyphenylene sulfide, poly(vinyl ester), polyvinyl chloride, bismaleimide polymer, polyanhydride, liquid crystalline polymer, polyether, polyphenylene oxide, cellulose polymer, benzoxazine, a hydrolytically stable polyphosphonate, or a combination of these.

In further embodiments, the TPU and phosphonate oligomers, phosphonate co-oligomers, phosphonate polymers, and phosphonate containing copolymers formulations may include one or more organic salts. An "organic salt," as used herein, encompasses any compound formed by the reaction between an organic acid and an inorganic base. Exemplary organic salts include, but are not limited to, sodium 2,5-difluorobenzenesulfonate, sodium 2,4,5-tribromobenzenesulfonate, sodium p-iodobenzenesulfonate, sodium 2,4-dibromo-5-fluorobenzenesulfonate, calcium 2,5-dichlorobenzenesulfonate, disodium 2,5-dichlorobenzene-1,3-disulfonate, sodium 4,4'-dibromobiphenyl-3-sulfonate, disodium 1,4-dichloronaphthalene-x,y-disulfonate, disodium 2,2-dichloro-1,1-bis(4'-chloro-phenyl)ethylene-3',3''-disulfonate, Sodium 2,4-dinitrobenzenesulfonate, calcium 2-chloro-5-nitrobenzenesulfonate, calcium 3-(trifluoromethyl)benzenesulfonate, sodium 3-bromo-5-(trifluoromethyl)benzenesulfonate, lithium 2,4,5-trichlorobenzenesulfonate, lithium p-bromobenzenesulfonate, barium 2,4,5-trichlorobenzenesulfonate, potassium 4-chloro-3-nitrobenzenesulfonate, magnesium 2,4,5-trichlorobenzenesulfonate, strontium 2,4,5-trichlorobenzenesulfonate, sodium 2-chloro-4-cyanobenzenesulfonate, calcium 3-chloro-4-methylbenzenesulfonate, sodium 4-chloro-3-methylbenzenesulfonate, sodium 3,5-dichloro-2-methylbenzenesulfonate, sodium 3-(trifluoromethyl)-5-(ar-pentachlorobenzyl)benzenesulfonate, sodium 2-chloro-4-(trifluorovinyl)benzenesulfonate, sodium 4'-bromo-α,α'-dichlorostilbenesulfonate, potassium tetrakis(4-chlorophenyl)ethylene-3-sulfonate, sodium 4,2',3',4',5',6',4''-heptachlorotriphenylmethane-3-sulfonate, disodium 1,1,1-trichloro-2-(4'-cyanophenyl)-2-(4-chlorophenyl) ethanesulfonate, sodium 2,2-bis(4'-chlorophenyl)-hexafluoropropane-3'-sulfonate, lithium 9,10-dichloroanthracenesulfonate, sodium 1,3,6,8-tetrachloropyrene-4-sulfonate, sodium 2,3-dichlorobenzenesulfonate, sodium 2,3,4-trichlorobenzenesulfonate, sodium pentachlorobenzenesulfonate, sodium 2,3,5,6-tetrachlorobenzenesulfonate, sodium 2,3,4,5-tetrabromobenzenesulfonate, trisodium 2,4,6-trichlorobenzene-1,3,5-trisulfonate, p-fluorobenzene sulfonic acid, 2,3,4,5-tetrafluorobenzenesulfonic acid, pentafluorobenzenesulfonic acid, p-chlorobenzenesulfonic acid, 2,4-dichlorobenzenesulfonic acid, p-bromobenzenesulfonic acid, 2,5-dibromobenzenesulfonic acid, 2-bromo-4-chlorobenzenesulfonic acid, 2-chloro-4-bromobenzenesulfonic acid, 2-bromo-5-chlorobenzenesulfonic acid, 2-chloro-5-bromobenzenesulfonic acid, 2,3,4-trichlorobenzenesulfonic acid, 2,4,6-trichlorobenzenesulfonic acid, 2,3,4,5-tetrachlorobenzenesulfonic acid, 2,3,5,6-tetrachlorobenzenesulfonic acid, 2,3,4,6-tetrachlorobenzenesulfonic acid, pentachlorobenzenesulfonic acid, 1-chloronaphthalene-x-sulfonic acid, 1,x-dichloronaphthalene-y-sulfonic acid, 1-bromonaphthalene-x-sulfonic acid, 4,5-dichlorobenzene-1,3-disulfonic acid, and combinations thereof. In other embodiments, the organic salts may be sodium or calcium salts of oligomeric or polymeric sulfonic acids such as, but not limited to, sodium or calcium salts of poly(monochlorostyrene)sulfonic acid containing one sulfonate group per 5.4 phenyl rings. In particular embodiments, the organic salt may be potassium diphenylsulfone sulfonate (KSS) and sodium trichlorobenzene sulfonate (STB), potassium perfluorobutane sulfonate (KPFBS), p-toluenesulfonic acid sodium salt (NaTS), poly(styrenesulfonic acid sodium salt) and similar salts, potassium 2,4,5-trichlorobenzene, potassium-2,4,5-trichlorobenzenesulfonate, and combinations thereof. Quantities of such organic salts known to be useful in the polymer arts are known in the art, and any concentration of organic salt sufficient to provide flame resistance may be used in embodiments. For example, in certain embodiments, the organic salts may be provided at about 0.01 wt. % to about 1.0 wt. %.

In further embodiments, a co-additive may be provided along with the organic salts to improve, for example, clarity of the resulting polymer and/or processability. Examples of co-additives that provide such properties include, but are not limited to, octaphenylcyclotetrasiloxane, poly(methyl siloxane), poly(methylphenyl siloxane), halogenated organic additives such as tetrabromobenzene, hexachlorobenzene, and hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms. Generally, small quantities of such co-additives are necessary to produce the desired result. For example, in various embodiments, less than 1.0 wt. % or less than 0.5 wt. % of such co-additives may be provided in the polymer compositions.

In still other embodiments, the TPU and phosphonate oligomers, phosphonate co-oligomers, phosphonate polymers, and phosphonate containing copolymers formulations may include additional components including, for example, reinforcing materials. For example, in some embodiments, the TPU and phosphonate oligomers, phosphonate co-oligomers, phosphonate polymers, and phosphonate containing copolymers formulations and such formulations including one or more other polymer or copolymer of the invention may be combined with unidirectional, woven, continuous or chopped glass fibers, carbon, ceramic, or an organic fiber to make prepreg and fiber reinforced composites, which may be used in, for example, laminates.

Polymer compositions including TPU and phosphonate oligomers, phosphonate co-oligomers, phosphonate polymers, and phosphonate containing copolymers and one or more other polymer exhibit an excellent combination of properties including good mechanical properties and excellent fire resistance. For example, such compositions as described above polymer may exhibit a limiting oxygen index of at least about 27, from about 27 to about 40 or about 28 to about 35, and so on or any specific value within these exemplary ranges.

Other embodiments are directed to methods for preparing the TPU and phosphonate oligomers, phosphonate co-oligomers, phosphonate polymers, and phosphonate containing copolymers compositions described above. Such embodiments generally include the step of mixing TPU with one or more phosphonate oligomers, phosphonate co-oligomers, phosphonate polymers, and phosphonate containing copolymers. The TPU and the phosphonate oligomers, co-oligomers, polymers or copolymers may be mixed using any mixing technique known in the art such as, but not limited to, melt mixing, solvent mixing, mixing of dry powders or pellets, and the like.

In some embodiments, the methods may further include the step of processing a mixture of TPU and one or more phosphonate oligomers, co-oligomers, polymers or copolymers using any of a variety of methods including, for example, heating, melting, blending, mixing, combining, rolling, extruding, co-extruding, pelletizing, molding, spin casting, calendaring, sintering, and the like, and combinations thereof, or other methods of processing. Such processing may result in a TPU and phosphonate oligomers, phosphonate co-oligomers, phosphonate polymers, and phosphonate containing copolymers mixture in any form known in the art such as, for example, adhesives, coatings, films, fibers, foams, sheets, moldings, and the like. In still other embodiments, the methods may include combining the TPU and phosphonate oligomers, phosphonate co-oligomers, phosphonate polymers, and phosphonate containing copolymers mixtures with one or more additional components, such as, for example, reinforcing materials. Such reinforced materials may include TPU and phosphonate oligomers, phosphonate co-oligomers, phosphonate polymers, and phosphonate containing copolymers formulations and such formulations including one or more other polymer or copolymer combined with continuous or chopped glass fibers, carbon, ceramic, or an organic fiber to make fiber reinforced prepreg, and fiber reinforced composites that may in some embodiments, be used in laminates.

Further embodiments of the invention include articles of manufacture made from TPU and phosphonate oligomers, phosphonate co-oligomers, phosphonate polymers, and phosphonate containing copolymers formulations and such formulations including one or more other polymer or copolymer. Such articles of manufacture include coatings on plastics, metals, ceramic, or wood products, or the materials and formulations of embodiments can be used to fabricate coatings, free-standing films, fibers, foams, molded articles, and fiber reinforced composites.

In some embodiments the phosphonate oligomers, phosphonate co-oligomers, phosphonate polymers, and phosphonate containing copolymers may have reactive end groups such as hydroxyl, phenol, phosphonate, ester, carbonate, epoxy, vinyl, vinyl ester, isopropenyl, isocyanate, and combinations thereof. Such materials are described in U.S. Publication Application No. 2012/0172500 entitled "Oligomeric Phosphonates and Compositions Including the Same," published on Jul. 5, 2012. In some embodiments the phosphonate oligomers, phosphonate co-oligomers, phosphonate polymers, and phosphonate containing copolymers with reactive end groups may chemically react with the TPU or TPU oligomers or precursors upon mixing or blending or heating or any combination thereof.

In still other embodiments, the TPU and phosphonate oligomers, phosphonate co-oligomers, phosphonate polymers, and phosphonate containing copolymers formulations and such formulations including one or more other polymer or copolymer described above, which may or may not include components such as reinforcing materials can be used in a variety of applications. For example, such compositions may be used in electronic housings and interconnects, sheet molding products, consumer products, lighting, LEDs, footwear, blow molded films, snowmobile tracks, vehicle bushings, extruded sheets for building and construction applications, building and construction materials, flooring, roofing materials, weatherstripping, composite wood, apparel, household appliances, automotive interiors, marine structures, medical (general purpose tubing, hospital bedding, surgical drapes, wound dressings, catheters, and a variety of injection molded devices), packaging, car bumpers, electrical housing panels, computer and telecommunication equipment enclosures, and the like. In other embodiments, the materials and formulations of various embodiments described above may be used to fabricate components such as housings which become incorporated into articles of manufacture such as electronic consumer goods (i.e., televisions, computers, printers, cell phones, video games, DVD players, stereos and other similar electronic articles).

In yet other embodiments, TPU and phosphonate oligomers, phosphonate co-oligomers, phosphonate polymers, and phosphonate containing copolymers formulations and such formulations including one or more other polymer or copolymer of the invention may be used as reactive additives and combined with other polymers, oligomers or monomer mixtures to form blends. As such the TPU and phosphonate oligomers, phosphonate co-oligomers, phosphonate polymers, and phosphonate containing copolymers formulations and such formulations including one or more other polymer or copolymer may be provided or sold as an additive. Such polymer composition may include at least one TPU and phosphonate oligomers, phosphonate co-oligomers, phosphonate polymers, and phosphonate containing copolymers formulations and such formulations including one or more other polymer or copolymer of the invention with at least one commodity or engineering plastic. The polymer composition may be produced via blending, mixing, or compounding the constituent polymers, oligomers or monomers. Due to the structure and properties of the TPU and phosphonate oligomers, phosphonate co-oligomers, phosphonate polymers, and phosphonate containing copolymers formulations and such formulations including one or more other polymer or copolymer formulations, and polymer compositions of the invention, the resulting polymer compositions exhibit exceptional flame resistance (e.g., higher LOI) and melt processing characteristics.

The term "polymer composition," as used herein, refers to a composition that comprises at least one TPU combined with one or more phosphonate oligomers, phosphonate co-oligomers, phosphonate polymers, and phosphonate containing copolymers phosphonate polymer, oligomer, co-oligomer, polymer or copolymer and at least one other polymer, oligomer or monomer mixture. The other polymer, oligomer or monomer mixture may include those that comprise, or are partially comprised of, or are comprised of monomers intended to produce the following polymer families including but not limited to a polycarbonate, polyacrylate, polyacrylonitrile, polyester, polyamide, polystyrene, polyurethane, polyepoxy, poly(acrylonitrile butadiene styrene), polyimide, polyarylate, poly(arylene ether), polyethylene, polypropylene, polyphenylene sulfide, poly(vinyl ester), polyvinyl chloride, bismaleimide polymer, polyanhydride, liquid crystalline polymer, polyether, polyphenylene oxide, cellulose polymer, benzoxazine, a hydrolytically stable polyphosphonate, or a combination of these. Preferably the polymer composition exhibits a limiting oxygen index of at least 27.

The TPU/phosphonate polymer, oligomer, co-oligomer, polymer or copolymer formulations, and polymer compositions of the present invention may include other components, such as but not limited to fillers like unidirectional, woven, chopped or continuous glass, metal, carbon based, or ceramic fibers, dyes, antioxidants, additional flame retardants, anti-dripping agents, organic binders, polymeric binders, crosslinking agents, coupling agents, surfactants, wetting agents, lubricating agents, and other additives typically used with urethanes and polyurethanes. In some embodiments, the additives may include a colorant, ink, dye and/or pigment. In some embodiments, additional fire resistant additives may be included such as, but are not limited to, metal hydroxides, nitrogen containing flame retardants such as melamine cyanurate, phosphinate salts, organic phosphates, other phosphonates, organic sulfonate salts, perfluorinated sulfonate salts, siloxanes, and the like.

The TPU/phosphonate polymer, oligomer, co-oligomer, polymer or copolymer formulations, and polymer compositions of the present invention can be used as coatings on plastics, metals, ceramic, or wood products or they can be used to fabricate articles, such as free-standing films, fibers, foams, molded articles and fiber reinforced composites. These articles may be well-suited for applications requiring fire resistance.

The TPU/phosphonate polymer, oligomer, co-oligomer, polymer or copolymer formulations, and polymer compositions of the present invention exhibit outstanding flame resistance and good melt processability. Such improvements make these materials useful in applications in the automotive and electronic sectors that require outstanding fire retardancy, high temperature performance, and melt processability. For example, they may be useful in the fabrication of molded parts which are used in a wide variety of electronic components that are used to fabricate consumer electronics that may include computers, printers, modems, laptops computers, cell phones, video games, DVD players, stereos and similar items.

Although the present invention has been described in considerable detail with reference to certain preferred embodiments thereof, other versions are possible. Therefore the spirit and scope of the appended claims should not be limited to the description and the preferred versions contained within this specification. Various aspects of the present invention will be illustrated with reference to the following non-limiting examples. The following examples are for illustrative purposes only and are not to be construed as limiting the invention in any manner.

EXAMPLES

Preparation of Blends

Blends were prepared by hand mixing and melt mixing the TPU and phosphonate oligomers, phosphonate polymers, and phosphonate containing copolymers in a 30 mm Werner and Pfleider, co-rotating twin screw extruder, model ZS B25 (L/D=40). The extruder had eight heating zones including the adaptor and die zone and the temperatures in the zones were set at 210-220° C. The mixtures were subsequently injection molded into various test specimens using a 30T Trubor (S/N 8230-5, model 30-RS-1, 1/2/oz). The 4 zone temperatures, including the die and the nozzle, varied from 200-210° C. depending on the blend composition. Blends were prepared from several different commercially available TPUs and commercially available polyphosphonates (FRX100), phosphonate oligomer (OL5000), and poly(phosphonate-co-carbonates) (CO35, CO60) prepared as described in U.S. Pat. Nos. 6,861,499 and 7,816,486. The polyphosphonates and phosphonate oligomer that were used contained about 10.4-10.7 wt % of P. The CO35 and CO60 poly(phosphonate-co-carbonate)s contained about 3.7 and 6.4 wt % of P. Additional characteristics are shown in Table 1. ESTANE® 58887, ESTANE® ETE 50DT3 (polyether based TPUs), and ESTANE® 58271 (polyester based TPU) are commercial TPUs from Lubrizol Advanced Materials, Inc., Elastollan® 1185A (polyether based TPU), and Elastollan® C85A (polyester based TPU) are commercial products from BASF Corporation, and PEARLTHANE® 16N80 is a commercial TPU available from Merquinsa, Inc.

TABLE 1

| Polyphosphonate Characteristics | | | | | |
|---|---|---|---|---|---|
| | Mw [kg/mole, PS] | Mn [kg/mole, PS] | Tg [° C.] | MVR (210° C., 1.2 kg) [ml/10 min] | MVR (140° C., 1.2 kg) [ml/10 min] | MVR (240° C., 2.16 kg) [ml/10 min] |
| FRX100-1 | 48.8 | 10.3 | 99 | 9.7 | — | — |
| FRX100-2 | 54.9 | 9.5 | 97 | 11.6 | — | — |
| FRX100-3 | 83.3 | 12.5 | 103 | 7.8 | — | — |
| OL5000 | 12.2 | 6.6 | 90 | — | 8.1 | — |
| CO35 | 54.8 | 20.4 | 127 | — | — | 5.9 |
| CO60 | 69.5 | 22.2 | 118 | — | — | 7.2 |

GPC

Molecular weight distributions were determined by measuring ~0.5 (w/v) % solutions of polymer in tetrahydrofuran by gel permeation chromatography (GPC) using a refractive index detector. Calibration of the instrument was conducted with linear polystyrene (PS) standards of known molecular weights. The weight average (Mw), number average (Mn) and polydispersity (Mw/Mn), referred to as PD, were evaluated from the chromatograms by using WinGPC software.

DSC

Glass transition temperatures (Tg) were measured using differential scanning calorimetry (DSC). The material was heated at a rate of 10° C./min to 250° C. After keeping the sample at this temperature for 10 minutes, the temperature of the sample was decreased at a rate of 40° C./min to 10° C. The Tg was determined during a second heating cycle (10° C./min to 250° C.) based on the ½ Cp method.

MVR

The Melt Volume Rate (MVR) of samples was determined at different set temperatures and weights using a Dynisco Melt Flow Indexer. Samples were held at the respective temperature for 6 minutes before the measurement was started.

Tensile Properties

Tensile properties were measured according ISO 527-1 using ISO 3167 multipurpose test specimen (width of 10 mm, thickness of 4 mm). The cross-head speed was 500 mm/min.

Hardness

The hardness of the TPUs was tested according ASTM D2240 on plaques of 3 mm thickness taking the initial reading of the instrument.

% T

The transparency (% T) of the blends was determined by molding plaques of 3 mm and measuring the transparency of these plaques using a DataColor 650 UV-Vis spectrophotometer.

ASTM E-162

The test was conducted in accordance with ASTM Designation E-162, "Standard Method of Test for Surface Flammability of Materials Using a Radiant Heat Energy Source". Test specimens of 6" by 18" were predried for 24 hours at 60° C. and then conditioned to equilibrium at a controlled temperature of 23+/−3° C., and a relatively humidity of 50+/−5 percent. Thickness of the sample was 0.33" (0.056" thk the on 0.27" thk board).

ASTM E-84-10b

The test was conducted in accordance with ASTM designation E-84, "Standard Method of Test for Surface Burning Characteristics of Building Materials". The test sample was a TPU film with a thickness of 26-30 mils. The sample consisted of five test panels with a total length of 24 feet and 2 feet wide. The panels were prepared by adhering the polymer to ¼-inch thick cement board using contact cement. The panels were conditioned to equilibrium at 71+/−2° F. and a relative humidity at 50+/−5 percent. For testing, the panels were placed end-to-end on the ledges of the tunnel furnace and tested with no auxiliary support mechanism.

Comparative Examples 1-2 and Examples 1-4

ESTANE® ETE 50DT3/ESTANE® 58887 Blends with FRX100 and OL5000

The blends were prepared and fabricated into test specimens as described above. The compositions of these blends are provided in Table 2. The mechanical and optical properties of these blends are provided in Table 3. The flame retardancy of these blends according the E162 and E84 test are described in Tables 4 and 5, respectively.

TABLE 2

Estane ® Blend Compositions (all numbers are in wt %)

| Example | ESTANE® ETE 50DT3 | ESTANE® 58887 | FRX100-1 | FRX100-2 | OL5000 |
|---|---|---|---|---|---|
| CE1 | 20 | 80 | 0 | 0 | 0 |
| CE2 | 50 | 50 | 0 | 0 | 0 |
| EX1 | 16 | 64 | 20 | 0 | 0 |
| EX2 | 40 | 40 | 20 | 0 | 0 |
| EX3 | 16 | 64 | 0 | 20 | 0 |
| EX4 | 16 | 64 | 0 | 0 | 20 |

TABLE 3

Mechanical and Optical Properties of blends described in Table 2

| Sample | Tensile Strength at Yield, MPa | Tensile Strength at 100% Yield, MPa | Tensile Strength at Break, MPa | Tensile Strain at Yield, % | Tensile Strain at Break, % | Shore Hardness | Optical Transparency, % |
|---|---|---|---|---|---|---|---|
| CE1 | N/A | 14.4 | 42 | N/A | 516 | 81A | 71 |
| CE2 | N/A | 13.3 | 39 | N/A | 542 | 85A | 73 |
| EX1 | — | — | — | — | — | 88A | 74 |
| EX2 | 18.5 | 17.4 | 31 | 8.7 | 396 | 88A | 75 |
| EX3 | 17.7 | 17.3 | 32 | 10.3 | 388 | 88A | 73 |
| EX4 | N/A | 7.6 | 18 | N/A | 568 | 85A | 76 |

TABLE 4

E162 and E84 Test Results for samples described in Table 2 (numbers for the E162 test are averages of three measurements).

| Sample | E162 test | | | E84 test | |
|---|---|---|---|---|---|
| | Flamespread Factor | Heat of Evolution | Flamespread Index | Flamespread Index | Smoke Development Index |
| CE1 | 31 | 4.2 | 130 | — | — |
| CE2 | 28 | 4.6 | 131 | — | — |
| EX1 | 7 | 1.6 | 12 | — | — |
| EX2 | 5 | 1.1 | 6 | — | — |
| EX3 | — | — | — | 24 | 189 |
| EX4 | 4 | 3 | 13 | — | — |

As illustrated in Tables 3 and 4, the TPU/polyphosphonate blends have good mechanical properties (Table 3) and an excellent fire resistance (Table 4). Depending on the use of a high Mw polyphosphonate or a low Mw phosphonate oligomer, the material demonstrate more rigid stiff properties (EX1-3) with a high modulus or more flexible properties with a low modulus and high elongation at break (EX4). Adding the polyphosphonates or phosphonate oligomers also hardly affected the hardness of the materials.

Irrespective of the Mw, all materials that contain the phosphonate additive obtained a class A rating in the E-162 test. A class A rating is obtained when the Flamespread Index is below 25. A class B rating is obtained with a Flamespread Index between 26 and 75, and the lowest rating, a C rating, is obtained when the Flamespread index is between 76 and 100. Thus, the comparative examples 1 and 2 even do not get a rating according this test.

Example 3 was tested according E84, where a similar rating as in the E-162 test is used. Additionally, a Smoke Development Index is measured that needs to be below 450 for either a class A, B, or C classification. The test data for Example 3 show that the material falls well within the class A rating according the E84 test.

Very surprisingly, the optical transparency of the materials did not decrease when the polyphosphonate or phosphonate oligomers were added. Thus, the materials remained transparent, had adjustable mechanical properties and excellent FR properties. This combination of properties has not been achieved before with TPUs using flame retardant additives.

Examples 5-6

Elastollan® 1185A Blends with FRX100

Additional blends were made using a different TPU source (Table 5) and varying the amount of polyphosphonate. These data confirmed the class A rating when adding 20 wt % of polyphosphonate to TPU. At 10% a class B rating was obtained. In both cases the optical transparency of the TPU remained unchanged and the blends with the polyphosphonate were transparent.

TABLE 5

% T and E162 test results for TPU samples with 10 and 20 wt % of polyphosphonates

| Sample | Elastollan® 1185A, wt % | FRX100-2, wt % | Optical Transparency, % | E162 test Flame-spread Factor | Heat of Evolution | Flame-spread Index |
|---|---|---|---|---|---|---|
| EX5 | 90 | 10 | 70 | 9 | 5 | 43 |
| EX6 | 80 | 20 | 64 | 5 | 3 | 15 |

Examples 7-12

Polyester Based TPU Blends with OL5000 and FRX100

Examples 1-6 were all made with polyether based TPUs. Additionally, a number of blends were made with polyester based TPUs to confirm whether it is possible to maintain transparency when adding polyphosphonates or phosphonate oligomers to these type of TPUs. The results are shown in Table 6, and demonstrate that it also was possible to obtain transparent blends of polyester based TPUs when blending with polyphosphonates of phosphonate oligomers. Even adding up to 40 wt % of polyphosphonate did not result in a substantial decrease in optical transparency.

TABLE 6

Hardness and % T for polyester based TPUs with different levels of polyphosphonates

| Sample | Estane® 58271, wt % | Elastollan® C85A10US, wt % | FRX100-3, wt % | OL5000, wt % | Shore Hardness | Optical Transparency, % |
|---|---|---|---|---|---|---|
| EX7 | 80 | — | — | 20 | 87A | 77 |
| EX8 | 80 | — | 20 | — | 88A | 73 |
| EX9 | 60 | — | 40 | — | 89A | 72 |
| EX10 | — | 80 | — | 20 | 88A | 75 |
| EX11 | — | 80 | 20 | — | 90A | 68 |
| EX12 | — | 60 | 40 | — | 90A | 69 |

Examples 13-16

Polyether and Polyester Based TPU Blends with poly(phosphonate-co-carbonates)

Finally, blends of both polyester TPUs and polyether TPUs were made with poly(phosphonate-co-carbonates) (Table 7). Both the polyester and polyether based TPUs that were blended with the poly(phosphonate-co-carbonate) with a relatively high level of phosphonate linkages (CO60) showed similar high transmission values as the TPUs that were blended with the polyphosphonates. The poly(phosphonate-co-carbonate)s with a relatively low level of phosphonate linkages (CO35) still were transparent but the % T had dropped from 70 to 40%. These results also demonstrate the unexpected behavior that a high level of phosphonate groups in the backbone of these type of polymers has a positive effect on the % T of the ultimate blends of these materials with TPUs.

TABLE 7

Hardness and % T for TPUs with different levels of poly(phosphonates-co-carbonates)

| Sample | Elastollan® 1185A, wt % | Elastollan® C85A10US, wt % | CO35, wt % | CO60, wt % | Shore Hardness | Optical Transparency, % |
|---|---|---|---|---|---|---|
| EX13 | 80 | — | 20 | — | 84A | 42 |
| EX14 | 80 | — | — | 20 | 89A | 70 |
| EX15 | — | 80 | 20 | — | 79A | 41 |
| EX16 | — | 80 | — | 20 | 80A | 70 |

The invention claimed is:

1. A composition comprising thermoplastic polyurethane and about 5 wt. % to about 50 wt. % of one or more aryl phosphonate oligomer or polymer selected from the group consisting of polyphosphonates, oligophosphonates, random co-oligo(phosphonate ester)s and co-oligo(phosphonate carbonate)s or block co-oligo(phosphonate ester)s or co-oligo (phosphonate carbonate)s, and combinations thereof, wherein the composition has an optical transparency of at least 40% for a 3 mm plaque wherein the aryl phosphonate oligomer or polymers have a weight average molecular weight of from about 1,000 g/mole to about 140,000 g/mole using polystyrene standards.

2. The composition of claim 1, wherein the composition satisfies the class A requirements according the ASTM E162 or ASTM E84 test.

3. The composition of claim 1, further comprising one or more additives selected from the groups consisting of antioxidants, flame retardant additives, anti-dripping agents, UV stabilizers, inks, dyes, pigments, organic salts, and combinations thereof.

4. The composition of claim 1, further comprising a reinforcement material selected from the group consisting of continuous or chopped glass fibers, continuous or chopped carbon fibers, continuous or chopped ceramic fibers, a fibrous organic material, and combinations thereof.

5. The composition of claim 1, further comprising one or more additional polymers selected from the group consisting of polycarbonate, polyacrylate, polyacrylonitrile, polyester, polyamide, polystyrene, polyurethane, polyepoxy, poly(acrylonitrile butadiene styrene), polyimide, polyarylate, poly(arylene ether), polyethylene, polypropylene, polyphenylene sulfide, poly(vinyl ester), polyvinyl chloride, bismaleimide polymer, polyanhydride, liquid crystalline polymer, polyether, polyphenylene oxide, cellulose polymer, benzoxazine, a hydrolytically stable polyphosphonate, and combinations thereof.

6. The composition of claim 1, wherein the aryl phosphonate oligomer or polymer comprises one or more functional end groups selected from the group consisting of hydroxyl, phenol, phosphonate, ester, carbonate, epoxy, vinyl, vinyl ester, isopropenyl, isocyanate and combinations thereof.

7. The composition of claim 1, wherein the composition exhibits a limiting oxygen index of at least about 27.

8. An article of manufacture comprising a blend of a thermoplastic polyurethane and about 5 wt. % to about 50 wt. % of one or more aryl phosphonate oligomer or polymer selected from the group consisting of polyphosphonates, oligophosphonates, random co-oligo(phosphonate ester)s and co-oligo(phosphonate carbonate)s block co-oligo(phosphonate ester)s or co-oligo(phosphonate carbonate)s, and combinations thereof, wherein the blend has an optical transparency of at least 40% for a 3 mm plaque wherein the aryl phosphonate oligomer or polymers have a weight average molecular weight of from about 1,000 g/mole to about 140,000 g/mole using polystyrene standards.

9. The article of claim 8, wherein the article of manufacture is selected from electronic housings, interconnects, sheet molding products, consumer products, lighting, light emitting diodes (LEDs), footwear, blow molded films, snowmobile tracks, vehicle bushings, extruded sheets for building and construction applications, building and construction materials, flooring, roofing materials, weather stripping, composite wood, apparel, household appliances, automotive interiors, marine structures, medical tubing, hospital bedding, surgical drapes, wound dressings, catheters, packaging, car bumpers, electrical housing panels, computer and telecommunication equipment enclosures, and housings for electronic consumer goods.

10. The article of claim 8, further comprising one or more additives selected from the groups consisting of anti-oxidants, anti-dripping agents, UV stabilizers, organic salts, glass, carbon, aramide, graphite, lubricants, continuous fiber, chopped fiber, and combinations thereof.

11. The article of claim 8, further comprising a reinforcement material selected from the group consisting of continuous or chopped glass fibers, continuous or chopped carbon fibers, continuous or chopped ceramic fibers, a fibrous organic material, and combinations thereof.

12. The article of claim 8, further comprising one or more additional polymers selected from the group consisting of polycarbonate, polyacrylate, polyacrylonitrile, polyester, polyamide, polystyrene, polyurethane, polyepoxy, poly(acrylonitrile butadiene styrene), polyimide, polyarylate, poly(arylene ether), polyethylene, polypropylene, polyphenylene sulfide, poly(vinyl ester), polyvinyl chloride, bismaleimide polymer, polyanhydride, liquid crystalline polymer, polyether, polyphenylene oxide, cellulose polymer, benzoxazine, a hydrolytically stable polyphosphonate, and combinations thereof.

* * * * *